United States Patent [19]

Fischer

[11] Patent Number: 5,022,426
[45] Date of Patent: Jun. 11, 1991

[54] PRESSURE OPERATED SEQUENCING VALVE

[76] Inventor: Andrew P. Fischer, 1110 Elm Ave., Modesto, Calif. 95351

[21] Appl. No.: 548,570

[22] Filed: Jul. 5, 1990

[51] Int. Cl.⁵ .............................................. F16K 11/07
[52] U.S. Cl. ................................ 137/119; 137/624.18; 251/230
[58] Field of Search .............. 137/119, 624.14, 624.18, 137/624.2; 251/230

[56] References Cited

U.S. PATENT DOCUMENTS

| | | | |
|---|---|---|---|
| 3,018,788 | 1/1962 | Perlis | 137/624.11 X |
| 3,459,208 | 8/1969 | Clyde | 137/119 |
| 4,877,047 | 10/1989 | Isidoro | 137/119 |

*Primary Examiner*—Alan Cohan
*Attorney, Agent, or Firm*—Robert M. Sperry

[57] ABSTRACT

An improved sequencing valve comprising a housing having a desired number of inlet and outlet ports, a piston normally urged to an inoperative position and responsive to inlet pressure to pass fluid to an appropriate one of said outlet ports, together with camming means responsive to movement of said piston to rotate said piston in a positive step-wise fashion.

10 Claims, 2 Drawing Sheets

PRESSURE OPERATED SEQUENCING VALVE

BACKGROUND

1. Field of Invention

This invention relates to sequencing valves and is particularly directed to sequencing valves which are operated by pressure of fluid supplied to the inlet thereof.

2. Prior Art

Sequencing valves are frequently used in irrigation systems and the like to distribute fluid, such as water, from a single supply source to one or another of a plurality of irrigations points, such as sprinklers. Thus, for example, a golf course may have a single water supply pipe supplying a sequencing valve which passes the water, in turn, to sprinklers serving a respective one of the fairways of the golf course. When it is desired to switch the system to irrigate a different fairway, the sequencing valve is stepped to its next position to pass the water to the sprinklers serving the new fairway. The stepping action of the sequencing valve is conventionally accomplished by turning the water supply "OFF" and "ON" to provide a pressure pulse to which the sequencing valve responds by advancing one step. Unfortunately, many of the prior art sequencing valves are highly complex devices which are expensive to produce and require considerable maintenance. Still other prior art sequencing valves have been unreliable in operation and have failed to properly regulate the flow of water in a desired manner. Also, some prior art sequencing valves have been electrically actuated. However, for large irrigation systems, such as farms, golf courses and the like, this requires running extensive lengths of electrical wiring, which is expensive and is subject to breakage or weathering, thereby adding an additional maintenance factor. A search in the U.S. Patent Office has revealed the following:

| U.S. Pat. No. | INVENTOR | ISSUED |
| --- | --- | --- |
| 3,730,208 | D. E. Lewis | May 1, 1973 |
| 3,759,283 | T. Maeda | Sep. 18, 1973 |
| 4,305,417 | W. W. Bell, Jr. | Dec. 15, 1981 |
| 4,492,247 | G. H. Lockwood | Jan. 8, 1985 |

Each of these reference is subject to the limitations set forth above. Thus, none of the prior art sequencing valves have been entirely satisfactory.

BRIEF SUMMARY AND OBJECTS OF INVENTION

These disadvantages of prior art sequencing valves are overcome with the present invention and an improved sequencing valve is provide which is simple and inexpensive to construct, accurate and reliable in operation and requires little, if any, maintenance.

The advantages of the present invention are preferably attained by providing an improved sequencing valve comprising a housing having a desired number of inlet and outlet ports, a piston normally urged to an inoperative position and responsive to inlet pressure to pass fluid to an appropriate one of said outlet ports, together with camming means responsive to movement of said piston to rotate said piston in a positive step-wise fashion.

These and other objects and features of the present invention will be apparent from the following detailed description, taken with reference to the figures of the accompanying drawing.

DETAILED DESCRIPTION OF THE INVENTION

Figure 1:
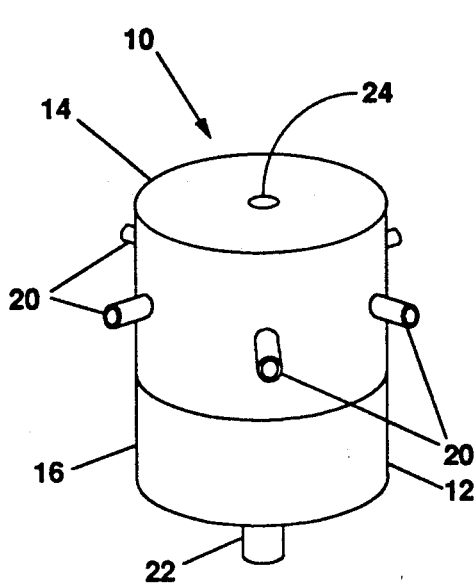
FIG. 1 is an isometric view of a sequencing valve embodying the present invention.
Figure 2:
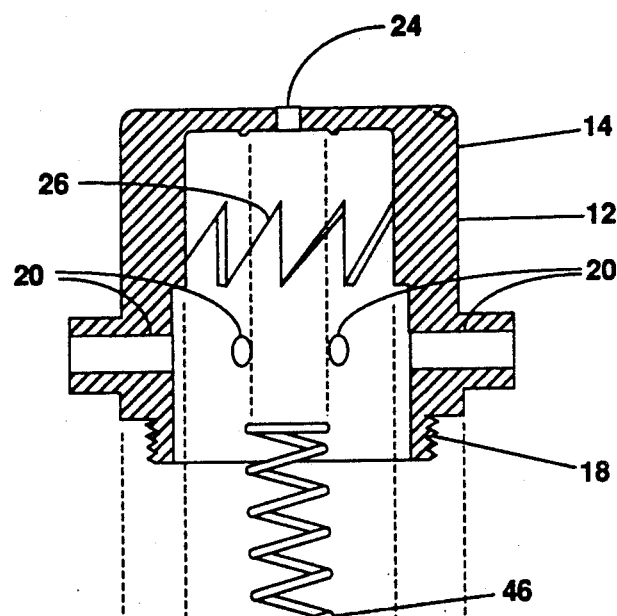
FIG. 2 is an exploded view of the sequencing valve of FIG. 1.
Figure 3:
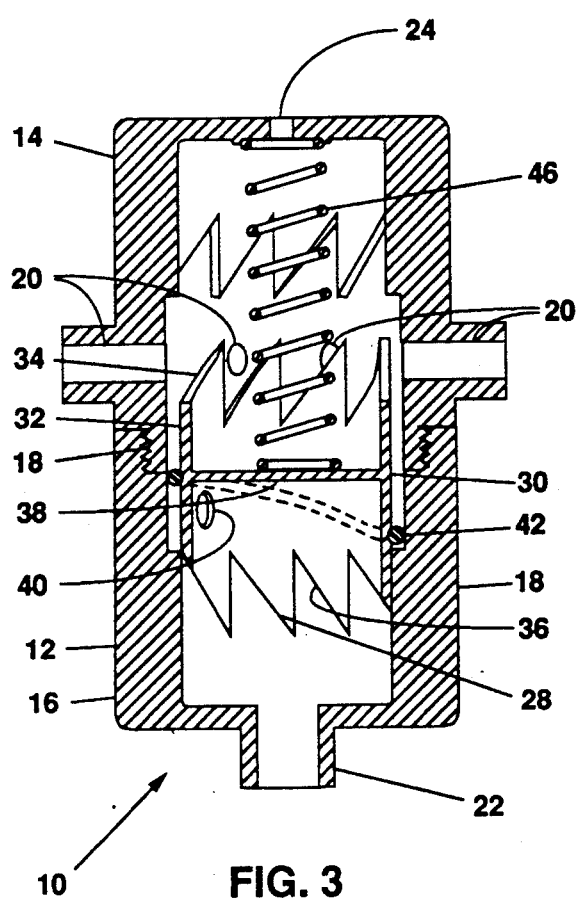
FIG. 3 is a vertical section through the sequencing valve of FIG. 1.

In that form of the present invention chosen for purposes of illustration in the drawing, FIGS. 1, 2 and 3 show a sequencing valve, indicated generally at 10, having a hollow, cylindrical housing 12. As shown, the housing 12 comprises an upper half 14 and a lower half 16 which are joined together by suitable means, such as threads 18. The upper half 14 of the housing 12 is formed with a plurality of outlet ports 20 disposed about the periphery thereof, while the lower half 16 of the housing 12 has an inlet port entering the bottom of the housing 12, as seen at 22. As seen in FIG. 1, six outlet ports 20 and one inlet port 22 are provided. However, it will be understood, by those skilled in the art, that these numbers could be varied substantially as desired. If desired, an air vent 24 may be provided in the top of the upper half 14 of housing 12. Within the upper half 14 and lower half 16 of the housing 12 are camming surfaces 26 and 28 and a piston 30 is slidably mounted within the housing 12. As best seen in FIG. 2, the piston 30 comprises a cylindrical member 32 having upper and lower camming surfaces 34 and 36 which cooperate with camming surfaces 26 and 28, respectively, to cause step-wise rotation of the piston 30, as described more fully below. The piston 30 has a wall 38 located generally centrally of the cylindrical member 32 and has an opening 40 extending through the cylindrical member 32 below the wall 38. The exterior of the cylindrical member 32 is provided with a groove 42 which serves to seat a suitable O-ring 44. The groove 42 is curved so as to cause the O-ring 44 to be located above the opening 40 and curves downwardly on either side of the opening 40. Thus, when the piston 30 is in its raised position, the opening 40 will be aligned with an appropriate one of the outlet ports 20 of the housing 12 and O-ring 44 will serve to allow fluid from opening 40 to flow through the aligned outlet port 20, but will prevent fluid from flowing laterally about the piston 30 to the other outlet ports 20. Finally, a spring 46 is located between the wall 40 of the piston 30 and the upper half 14 of the housing 12 to normally urge the piston 30 to its downward position, as seen in FIG. 3.

Figure 4:
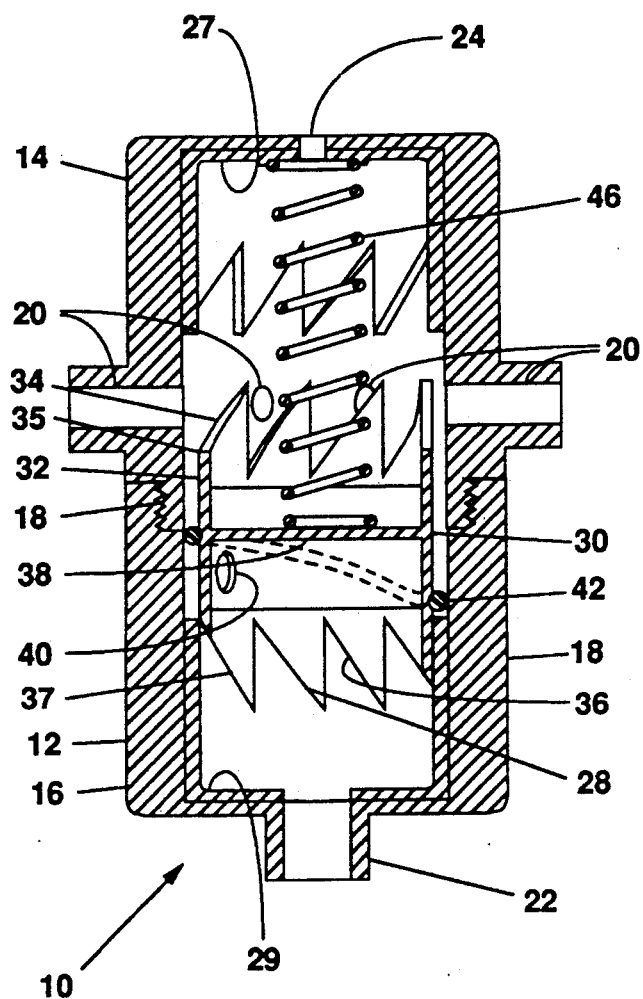
FIG. 4 is a view, similar to that of FIG. 3, showing inserts for the camming surfaces.

In use, the piston 30 is normally urged, by spring 46, into the downward position, as seen in FIG. 3. However, when fluid is delivered through the inlet port 22 of housing 12, the fluid serves to push the piston 30 upward, against the action of spring 46, until opening 40 of the piston 30 becomes aligned with one of the outlet ports 20 of the housing 12. When this occurs, the fluid can pass through opening 40 and the aligned one of the outlet ports 20 to supply the fluid to a desired location. At the same time, however, O-ring 44 sealingly engages the interior of the housing 12 to prevent fluid from passing laterally about the piston 30 to pass out of any of the ports 20 which is not aligned with the opening 40. As the piston 30 continues upward, due to the pressure of the fluid flowing through inlet port 22, camming surface 34 of the piston 30 engages camming surface 26 in the upper half 14 of the housing 12, causing the piston to rotate until the camming surfaces 34 and 26 are fully engaged. Subsequently, when the fluid pressure through inlet port 22 is reduced or halted, spring 46 will urge the piston 30 downward, whereupon camming surface 36 of piston 30 will engage camming surface 28 on the lower half 16 of housing 12 and this again will serve to rotate the piston 30 until the camming surfaces 36 and 28 are fully engaged. As seen in FIGS. 2 and 3, mating camming surfaces 34 and 26 serve to rotate piston 30 through an arc of 30° or one twelfth of a circle. Similarly, mating camming surfaces 36 and 28 also serve to rotate piston 30 through an arc of 30° or one twelfth of a circle. Thus, one complete upward and downward cycle of the piston 30 serves to rotate the piston through an arc of 60° or one sixth of a circle. Since, as seen in FIG. 1, the housing 12 is provided with six outlet ports 20, it will be seen that one upward and downward cycle of the piston 30 serves to rotate the opening 40 of piston 30 from alignment with one of the outlet ports 20 into alignment with the next adjacent outlet port 20. Thus, consecutive pressure pulses by the fluid flowing through inlet port 22 will serve to advance the piston 30 in a step-wise fashion into alignment with successive ones of the outlet ports 20 of the housing 12 to provide the desired sequencing of the valve 10. Obviously, if housing 12 were provided with a different number of outlet ports 20, the slopes of the camming surfaces 26, 28, 34 and 36 would have to be altered to cause appropriate rotation of the piston. As shown, the camming surfaces 26 and 28 are integral with the upper half 14 and lower half 16 of the housing 12 and camming surfaces 34 and 36 are integral with the piston 30. However, it will be apparent that, if desired, the camming surfaces 26 and 28 could be provided as inserts as seen at 27 and 29 in FIG. 4, which could be removably secured within the housing 12, while camming surfaces 34 and 36 could be supplied as separate units as seen at 35 and 37 in FIG. 4, which could be removably attached to the appropriate ends of the piston 30.

As shown, the sequencing valve 10 comprises only three parts; i.e., the housing 12, the piston 30 and the spring 46, and the only moving part is the piston 30. Obviously, these components are quite simple and can be manufactured with minimum expense. This would still be true, even if the camming surfaces 26, 28, 34 and 36 were provided separately, as suggested above as an alternative. Furthermore, since the sequencing valve 10 has only one moving part, the piston 30, the valve 10 will require little, if any maintenance. Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A sequencing valve comprising:
    a generally cylindrical housing having at least one inlet port entering adjacent one end of said housing and having a plurality of outlet ports spaced evenly about the periphery of said housing adjacent the opposite end from said inlet port,
    a generally cylindrical piston located within said housing and slideable between a raised position and a lower position, said piston having an opening formed in the side wall thereof positioned to communicate with said outlet ports when said piston is in its raised position and having a wall closing said piston above said opening,
    sealing means carried by said piston to permit fluid from said opening to flow only to one adjacent outlet port,
    resilient means normally urging said piston to its lower position, and
    stepping means responsive to movement of said piston to its raised and lower positions to rotate said opening to advance to the next adjacent outlet port.
2. The sequencing valve of claim 1 wherein said stepping means comprises:
    first camming surfaces carried by said piston, and
    second camming surfaces located within said housing.
3. The sequencing valve of claim 2 wherein:
    said first camming surfaces are provided on the upper and lower edges of said piston, and
    said second camming surfaces are located adjacent the top and bottom of said housing.
4. The sequencing valve of claim 1 wherein:
    said sealing means is an O-ring positioned to lie above said opening and to extend downward about the sides of said opening and about said piston.
5. The sequencing valve of claim 1 wherein said stepping means comprises:
    first camming means carried by the upper edge of said piston,
    second camming means located within the upper end of said housing and cooperating with said first camming means upon movement of said piston to its raised position to rotate said opening one-half the distance to the next outlet port,
    third camming means carried by the lower edge of said piston, and
    fourth camming means located within the bottom of said housing and cooperating with said third camming means upon movement of said piston to its lower position to again rotate said opening one-half the distance to the next outlet.
6. The sequencing valve of claim 5 wherein:
    said first and third camming means are formed integral with said piston.
7. The sequencing valve of claim 5 wherein:
    said first and third camming means are releasably attached to said piston.
8. The sequencing valve of claim 5 wherein:
    said second and fourth camming means are integral with said housing.
9. The sequencing valve of claim 5 wherein:
    said second and fourth camming means are releasably secured within said housing.
10. The sequencing means of claim 1 wherein:
    said resilient means is a spring.

* * * * *